United States Patent

McCavit et al.

[11] Patent Number: 5,894,262
[45] Date of Patent: Apr. 13, 1999

[54] ELECTRONIC DOORBELL WITH REVERSIBLE DIODE

[75] Inventors: Kim Irwin McCavit, St. Joseph; Roger Donn Bentley, Coloma, both of Mich.

[73] Assignee: Heath Company, Benton Harbor, Mich.

[21] Appl. No.: 08/747,276

[22] Filed: Nov. 12, 1996

[51] Int. Cl.[6] .................................................. G08B 3/00
[52] U.S. Cl. .................... 340/328; 340/384.7; 340/513; 340/539; 340/553
[58] Field of Search ..................... 340/328, 539, 340/384.1, 553, 692, 384.7, 513, 330; 331/185; 363/57, 96, 139; 323/209

[56] References Cited

U.S. PATENT DOCUMENTS

| | | | |
|---|---|---|---|
| 3,614,760 | 10/1971 | Zimmet et al. | 340/539 |
| 3,711,854 | 1/1973 | Reynolds et al. | 340/513 |
| 4,236,147 | 11/1980 | Calvin | 340/553 |
| 4,523,193 | 6/1985 | Levinson et al. | 340/384.7 |
| 5,260,605 | 11/1993 | Barfield | 340/513 |
| 5,568,122 | 10/1996 | Xydis | 340/539 |

*Primary Examiner*—Jeffery Hofsass
*Assistant Examiner*—John Tweel, Jr.

*Attorney, Agent, or Firm*—Fitch, Even, Tabin & Flannery

[57] ABSTRACT

A doorbell circuit detects when one of a plurality of doorbell switches is depressed and provides an audible indication of the particular doorbell switch depressed. The doorbell circuit includes a detector circuit which will function properly with the diode, normally connected in parallel across one of the doorbell switches, connected with either polarity. A power supply is developed for the detector circuit from the doorbell transformer by way of the diode connected in parallel across one of the doorbell switches. The detector circuit includes one or more full-wave rectifiers, which provide a positive DC output signal irrespective of the polarity of the diode connected in parallel across the doorbell switch. Each of the doorbell switches is connected to an amplifier, which, in turn, is connected to a comparator. During conditions when none of the doorbell switches are depressed, the output level of the amplifier will be lower than the threshold level for the comparator to prevent an audible indication from being generated. Once one of the doorbell switches is depressed the amplifier will generate an output signal that is greater than the threshold value for the comparator to cause an audible indication to be generated.

22 Claims, 2 Drawing Sheets

ELECTRONIC DOORBELL WITH REVERSIBLE DIODE

BACKGROUND OF THE INVENTION

1. Field of the Invention

The present invention relates to an electronic doorbell circuit and more particularly to an electronic doorbell circuit that is adapted to be connected to one or more doorbell switches and a doorbell transformer that can detect when any one of the doorbell switches is depressed irrespective of the polarity of the diode, normally connected in parallel across one of the doorbell switches to provide electrical power from the doorbell transformer to the electronic doorbell circuit.

2. Description of the Prior Art

Electronic doorbell circuits are generally known in the art. Such doorbell circuits are normally coupled to a source of 120 volt AC electrical power and include a doorbell transformer for stepping down the 120 volt source voltage to a lower voltage, for example 16 volts AC or 24 volts AC. A secondary winding of the doorbell transformer is electrically connected to one or more doorbell switches and to a detector circuit for detecting when one of the doorbell switches is depressed to enable different tones or tone combinations to be generated to provide an audible indication of the particular switch depressed. In such known doorbell detector circuits, a diode is normally connected in parallel across one of the doorbell switches to develop a power supply for the detector circuit from the doorbell transformer. The polarity of the diode is determined by the detection circuitry. In known doorbell circuits, the detector circuitry is sensitive to the polarity of the diode, connected in parallel across one of the doorbell switches. With such circuitry, if the polarity of the diode is incorrect, the doorbell circuit will not operate.

Doorbell switches are normally located adjacent to doors and are thus remote from the balance of the doorbell circuitry. Although the diode across the doorbell switch can be preinstalled across the switch, the installer must correctly wire the switch with the proper polarity. As mentioned above, if the diode is installed with the improper polarity, the doorbell circuit will not work properly. As such, improper installation of the switch with the incorrect diode polarity can cause additional time and labor to reinstall the switch. In addition, when the doorbell switch is being replaced by a homeowner with little or no electrical experience, the potential for factory returns of the doorbell is increased, which, in turn, increases the cost of such doorbell circuits.

SUMMARY OF THE INVENTION

It is an object of the present invention to provide an electronic doorbell circuit which solves the problems of the prior art.

It is yet another object of the present invention to provide an electronic doorbell circuit that is insensitive to the polarity of a diode, connected in parallel across one of the doorbell switches.

Briefly, the present invention relates to a doorbell circuit for detecting when one of a plurality of doorbell switches is depressed and providing an audible indication of the particular doorbell switch depressed. The doorbell circuit includes a detector circuit which will function properly with the diode, normally connected in parallel across one of the doorbell switches, connected with either polarity. A power supply is developed for the detector circuit from the doorbell transformer by way of the diode connected in parallel across one of the doorbell switches. The detector circuit includes one or more full-wave rectifiers, which provide a positive DC output signal irrespective of the polarity of the diode connected in parallel across the doorbell switch. Each of the doorbell switches is connected to an amplifier, which, in turn, is connected to a comparator. During conditions when none of the doorbell switches are depressed, the output level of the amplifier will be lower than the threshold level for the comparator to prevent an audible indication from being generated. Once one of the doorbell switches is depressed the amplifier will generate an output signal that is greater than the threshold value for the comparator to cause an audible indication to be generated.

BRIEF DESCRIPTION OF THE DRAWING

These and other objects of the present invention will be readily understood with reference to the following specification and attached drawing, wherein.

DETAILED DESCRIPTION OF THE INVENTION

Figure 1A:
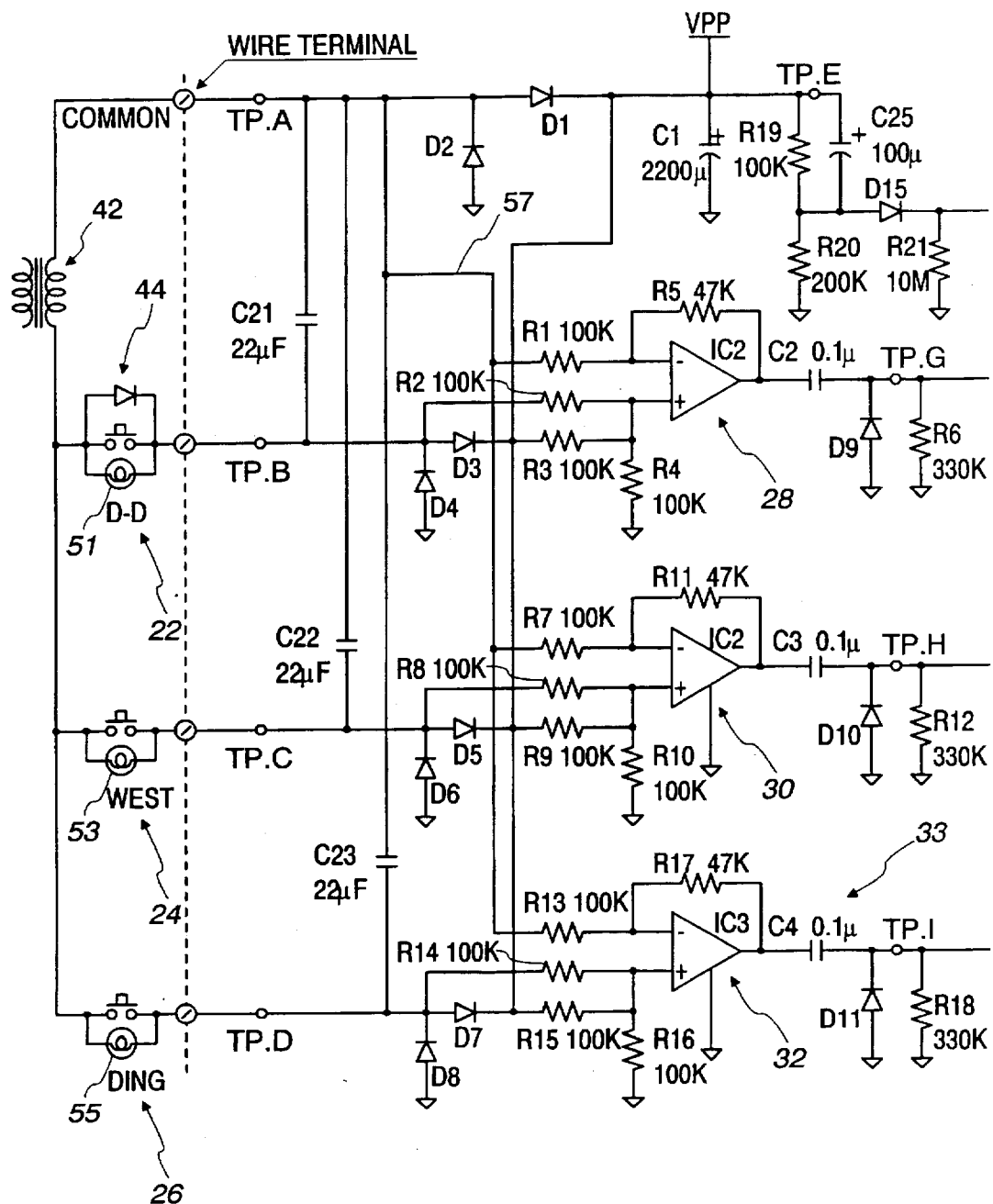
FIGS. 1a and 1b are a schematic representation of the doorbell circuitry in accordance with the present invention.
Figure 1B:
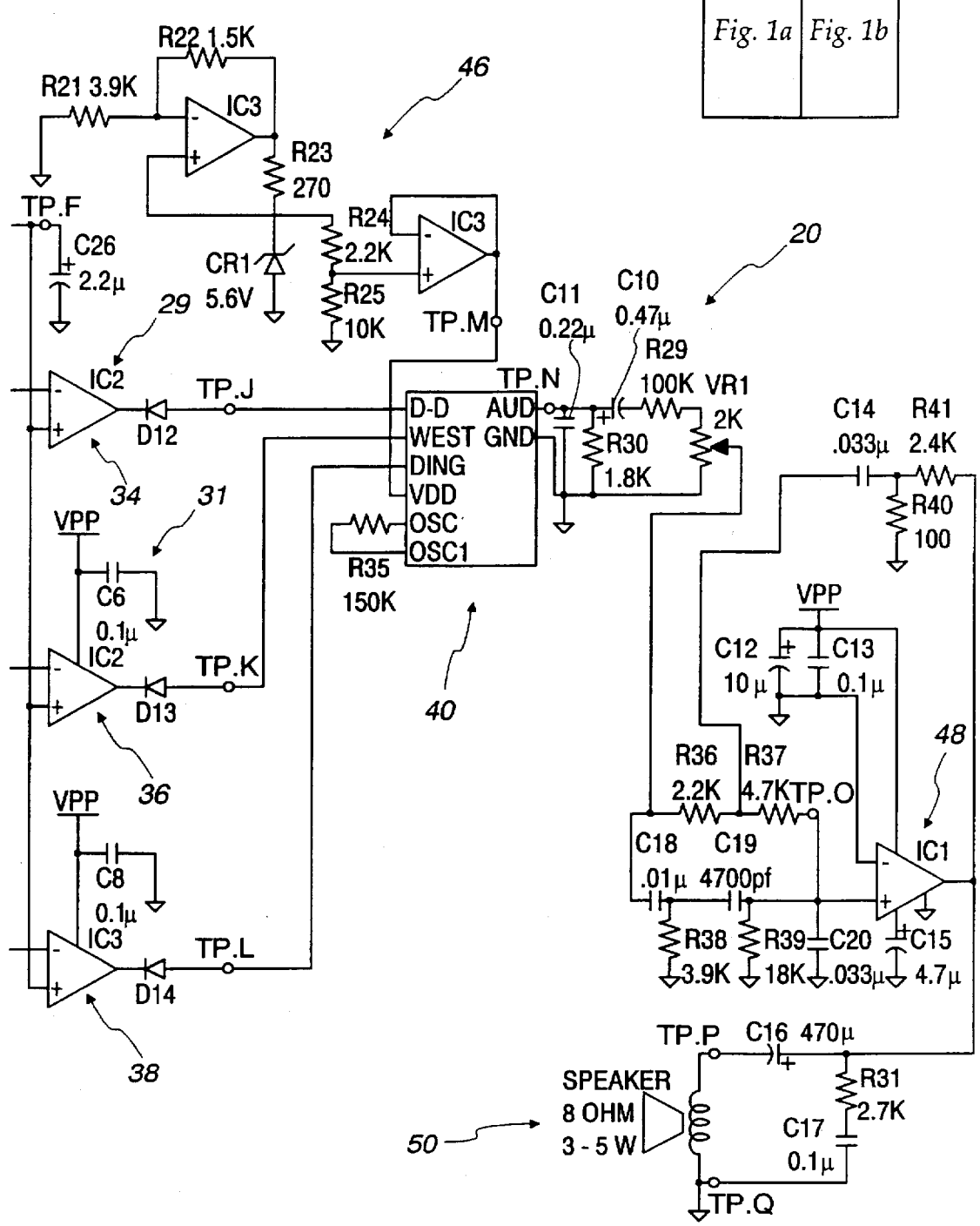

As shown in the Figure, the electronic doorbell circuit, in accordance with the present invention, generally identified with the reference numeral 20, is illustrated, for example, for use with three doorbell switches 22, 24 and 26. Each of the doorbell switches 22, 24 and 26 is coupled to an amplifier circuit, generally identified with the reference numerals 28, 30 and 32 respectively. The amplifier circuits 28, 30 and 32, in turn, are connected to three comparator circuits generally identified with the reference numerals 34, 36 and 38, respectively, forming three channels, 29, 31 and 33, one for each doorbell switch 22, 24 and 26. The output signals from the comparator circuits 34, 36 and 38 are applied to a sound generator 40.

The sound generator 40, for example, a Yield Technology model number 998, is provided with multiple channels to provide a different audible indication to represent the depression of each of the switches 28, 30 and 32. For example, the sound generator 40 can be configured to provide a single ding tone, a multiple DING-DONG tone, and a Westminster chime. As shown in the Figure, the doorbell switch 22 is coupled to the sound generator 40 to produce a multiple ding-dong tone when depressed. The doorbell switch 24, is connected to the sound generator 40 to produce a Westminster chime while the doorbell switch 26 is connected to the sound generator 40 to produce a single ding tone.

Electrical power is provided to the doorbell circuit 20 by way of a doorbell transformer 42 having a single primary and single secondary winding. The primary winding is connected to a 120 V source of AC power (not shown). The secondary winding, for example 16/24 V, provides power for the detector circuit 20. In particular, a diode 44 that can be connected across any one of the doorbell switches 22, 24, 26 (shown connected across the doorbell switch 22) is used to supply half-wave rectified power to the detector circuit 20. An important aspect of the invention is that the detector circuit 20 will work properly, irrespective of the polarity of the diode 44.

An important aspect of the invention relates to the full-wave rectifiers for each channel 29, 31 and 33 of the detector circuit 20. The full-wave rectifiers are formed by the diodes D1 and D2 and the diode pairs, D3/D4, D5/D6 and D7/D8. More particularly, the combination of the diodes D1, D2, D3 and D4 form a full-wave rectifier while the combination of the diodes D1 and D2 with the diodes D5 and D6 also form another full-wave rectifier. Lastly, the combination of the diodes D1 and D2, with the diodes D7 and D8, similarly form a full-wave rectifier. A key aspect of the invention is that either a positive or negative AC signal applied to any of the full-wave rectifiers will always produce a positive output signal. Thus, the detector circuit 20 will function properly, no matter which polarity is used for the diode 44, connected in parallel across one of the doorbell switches 22, 24 and 26.

Electrical power for the detector circuitry 20 is supplied by a voltage $V_{pp}$, stored on a power supply capacitor C1. A diode 44 provides either negative or positive halfwave rectified electrical power (depending on its polarity) to the full wave rectifier consisting of the diodes D1, D2, D3, and D4. As a result, a positive voltage $V_{pp}$ is developed across power supply capacitor C1.

In many doorbell installations, a small incandescent lamp 51, 53, 55 is provided in parallel with each doorbell switch 22, 24 and 26. These lamps, 51, 53, 55, provide enough light that the doorbell switch 22, 24, 26 can be easily seen in the dark. A plurality nonpolar capacitors C21, C22, and C23 provide an AC current path which provides continuous current to the lamps 51, 53, 55 if present. The nonpolar capacitors C21, C22, and C23 could be replaced by resistors; the nonpolar capacitors do not dissipate any power and therefor have the advantage of not raising the ambient temperature of the detector circuit 20.

The common input 57 to the detector circuit 20 is also applied to the inverting inputs of differential amplifier circuits 28, 30, and 32. A plurality of gain setting resistors R1/R5, R7/R11, and R13/R17 set the inverting gain of differential amplifiers 28, 30, and 32 relative to the signal on the common input 57. The inputs from each of the doorbell switches 22, 24, 26 are divided by resistor networks R2/R3/R4, R8/R9/R10, and R14/R15/R16 and then applied to the nonverting inputs of differential amplifiers 28, 30, and 32. The power supply voltage $V_{pp}$ is also applied to these resistor networks in order to properly bias the differential amplifiers 28, 30, and 32. The values of the above gain setting resistors and the resistor networks are chosen to ensure that the signal at the outputs of differential amplifiers 28, 30 and 32 will only be large enough to activate the comparator circuits 34, 36, and 38 if one of the respective doorbell switches 22, 24, or 26 is depressed.

The output of the amplifier circuits 28, 30 and 32 are AC coupled to the comparator circuits 34, 36 and 38 by way of AC coupling capacitors C2, C3 and C4, respectively. A diode resistor pair D9/R6, D10/R12 and D11/R18 is connected between ground and the inverting input of each of the comparators 34, 36 and 38. The diode resistor pairs D9/R6, D10/R12 and D11/R18 are used to level shift the signal so that only positive voltages are applied to the inverting inputs of the comparators 34, 36 and 38.

The threshold of the comparator circuits 34, 36 and 38 is set such that the comparators 34, 36 and 38 will only change logic states when one of the doorbell switches 22, 24 and 26 is depressed. The threshold value for the comparator circuits 34, 36 and 38 is applied to the non-inverting inputs of the comparator circuits 34, 36 and 38. The threshold value is derived from the power supply voltage $V_{pp}$. The power supply voltage $V_{pp}$ is divided by a voltage divider circuit which includes the resistors R19 and R20. A capacitor C26 is connected between the non-inverting inputs of the comparators 34, 36 and 38 and ground to stabilize the threshold voltage. The diode D15 prevents the capacitor C26 from discharging through the resistor R20. A capacitor C25 initially charges the capacitor C26 to a high value to prevent the comparators 34, 36 and 38 from false triggering when power is initially turned on.

During a condition when none of the doorbell switches 22, 24 or 26 are depressed, the output of the amplifier circuits 28, 30 and 32 will be generally lower than the threshold of the comparators 34, 36 and 38. However, once when of the doorbell switches 22, 24 or 26 is depressed, unrectified AC from the doorbell transformer 42 will be applied to the corresponding amplifier circuit 28, 30 and 32. During such a condition, the output of the corresponding amplifier circuit 28, 30 and 32 will result in a signal with a magnitude greater than the threshold levels of the comparators 34, 36 and 38 to cause the corresponding comparator 34, 36 and 38 to change states anytime one of the doorbell switches 22, 24 or 26 is depressed. The output of the comparator circuits 34, 36 and 38 is applied to the DING-DONG (DD), Westminster (West) and DING inputs of the sound generator 40 by way of serially connected diodes D12, D13 and D14, respectively. The diodes D12, D13 and D14 are used to prevent the relatively high-output voltage of the comparators 34, 36 and 38 from being applied to the inputs of the sound generator 40, since the normally high outputs of the comparators 34, 36 and 38 are relatively higher than the maximum input voltage range for the sound generator 40. During conditions when none of the doorbell switches 22, 24 or 26 is depressed, the outputs of all of the comparators 34, 36 and 38 will be high. Anytime one of the doorbell switches 22, 24 or 26 is depressed, the output of one of the comparators 34, 36 and 38 goes low. Since the DD, West and DING inputs on the sound generator 40 are generally high, the low output of one of the comparators 34, 36 and 38 (depending on the particular doorbell switch 22, 24, 26 depressed) will cause the corresponding diode D12, D13 and D14 to conduct and pull low one of the DD, West and DING inputs of the sound generator 40, depending on the particular doorbell switch 22, 24 or 26 depressed.

A power supply circuit, generally identified with the reference numeral 46 is used to develop a 3 V power supply for the sound generator 40. The power supply circuit utilizes a pair of operational amplifiers, IC3. One of the operational amplifiers IC3 includes an input resistor R21 and a feedback resistor R22, whose ratio determines the gain of the amplifier. The output of the first operational amplifier is connected to a resistor R23 and a zener diode CR1. The operational amplifier maintains a constant voltage across R23, which results in a constant current through CR1. The zener diode CR1 limits the input voltage to the first operational amplifier to approximately 5.6 V. A voltage divider consisting of the resistors R24 and R25 is connected in parallel across the zener diode CR1. The voltage across the resistor R25 is applied to a non-inverting input of the second operational amplifier IC3, configured as a follower and connected to the power supply pin $V_{dd}$ of the sound generator 40. A resistor R35 is connected across the oscillator inputs and sets the frequency of the doorbell tones.

The audio output of the sound generator 40 is coupled to a filter circuit which includes a pair of capacitors C10 and C11, a pair of resistors R29 and R30 and a variable resistor VR1 for volume control. The wiper for the potentiometer VR1 is connected to an audio amplifier circuit, generally identified with the reference numeral 48. The audio amplifier 48 may be a National Semiconductor model number LM384 5-watt audio power amplifier. A filter circuit, which includes the resistors R36, R37, R38 and R39 and the capacitors C18, C19 and C20, is connected to the non-inverting input of the audio power amplifier IC1. Ground is applied to the inverting input of the audio power amplifier IC1. A pair of capacitors C12 and C13 are connected in parallel across the power supply voltage $V_{pp}$ to stabilize it. The amplifier is configured with feedback that includes resistors R40 and R41 and a capacitor C14. The output of the operational amplifier IC1 is AC coupled to a speaker 50, for example an 8 ohm speaker, by way of an AC coupling capacitor C16. A resistor R31 and a capacitor C17 are connected between the capacitor C16 and ground to stabilize the audio amplifier.

Obviously, many modifications and variations of the present invention are possible in light of the above teachings. Thus, it is to be understood that, within the scope of the appended claims, the invention may be practiced otherwise than as specifically described above.

What is claimed and desired to be secured by letters patent of the United States is:

1. A detector circuit for a doorbell adapted to be connected to a source of electrical power and one or more doorbell switches, said doorbell switch adapted to be connected to a source of electrical power to provide an unrectified signal when said doorbell switch is depressed and a half-wave rectified signal to said circuit when said doorbell switch is not depressed, the detector circuit comprising:

a power supply, electrically coupled to said doorbell switch, said power supply including means for providing a positive output voltage in response to said source of half-wave rectified power, irrespective of the polarity of the half-wave rectified power signal;

at least one comparator electrically coupled to said doorbell switch, said comparator having a threshold which will cause the logic states of said comparator to change when said doorbell switch is depressed; and a sound generator coupled to the output of said comparator for generating one or more audible indications when said doorbell switch is depressed.

2. The detector circuit as recited in claim 1, further including an amplifier, electrically coupled to said doorbell switch for amplifying said half-wave and unrectified signals, the output of amplifier being electrically coupled to said comparator.

3. The detector circuit as recited in claim 2, wherein said detector circuit is formed with a plurality of channels, each channel adapted to being electrically coupled to one of a plurality of doorbell switches, each channel including a comparator, wherein said sound generator has a plurality of channels for providing a plurality of different audible indications, wherein the output of each of said comparators is connected to a different channel of said sound generator to provide an audible indication of the doorbell switch depressed.

4. The detector circuit as recited in claim 1, wherein said providing means includes at least one full-wave rectifier.

5. The detector circuit as recited in claim 1, wherein said source of half-wave rectified power includes a diode connected in parallel across said doorbell switch.

6. The detector circuit as recited in claim 1, wherein said power supply includes a power supply capacitor.

7. A detector circuit for a doorbell adapted to be connected to a source of electrical power and a plurality of doorbell switches, each of said doorbell switches adapted to be connected to a doorbell transformer, a diode connected in parallel across one of said plurality of doorbell switches to supply a source of half-wave rectified electrical power to said circuit when said doorbell switch is not depressed and an unrectified signal when said doorbell switch is depressed, the detector circuit comprising:

a power supply electrically coupled to said source of half-wave electrical power, said power supply including means for providing a positive output voltage in response to a half-wave rectified power signal, irrespective of the polarity of said half-wave rectified power signal; and means electrically coupled to said power supply for detecting when a doorbell switch has been depressed.

8. The detector circuit as recited in claim 7, wherein said detecting means includes a comparator having a threshold, wherein the threshold is set such that the logic states of said comparator change when any of said doorbell switches is depressed.

9. The detector circuit as recited in claim 7, further including a plurality of amplifiers, electrically coupled to said doorbell switches for amplifying said half-wave and unrectified signals, the output of amplifiers being electrically coupled to said comparators.

10. The detector circuit as recited in claim 7, wherein detector circuit is formed with a plurality of channels adapted to being electrically coupled to a plurality of doorbell switches, each channel including an amplifier and a comparator, each of said sound generator having a plurality of channels for providing a plurality of different audible indications, wherein the output of each of said comparators is connected to a different channel of said sound generator to provide an audible indication of the doorbell switch depressed.

11. The detector circuit as recited in claim 7, wherein said providing means includes at least one full-wave rectifier.

12. A detector circuit for a doorbell adapted to be connected to a source of electrical power and one or more doorbell switches, said doorbell switch adapted to be connected to a source of electrical power to provide an unrectified signal when said doorbell switch is depressed and a half-wave rectified signal to said circuit when said doorbell switch is not depressed, the detector circuit comprising:

a power supply, electrically coupled to said doorbell switch, said power supply including a circuit configured to provide a positive output voltage in response to said source of half-wave rectified power, irrespective of the polarity of the half-wave rectified power signal;

at least one comparator electrically coupled to said doorbell switch, said comparator having a threshold which will cause the logic states of said comparator to change when said doorbell switch is depressed; and a sound generator coupled to the output of said comparator for generating one or more audible indications when said doorbell switch is depressed.

13. The detector circuit as recited in claim 12, further including an amplifier, electrically coupled to said doorbell switch and configured to amplify said half-wave and unrectified signals, the output of amplifier being electrically coupled to said comparator.

14. The detector circuit as recited in claim 13, wherein said detector circuit is formed with a plurality of channels, each channel adapted to being electrically coupled to one of a plurality of doorbell switches, each channel including a comparator, wherein said sound generator has a plurality of channels for providing a plurality of different audible indications, wherein the output of each of said comparators is connected to a different channel of said sound generator to provide an audible indication of the doorbell switch depressed.

15. The detector circuit as recited in claim 12, wherein said circuit includes at least one full-wave rectifier.

16. The detector circuit as recited in claim 12, wherein said source of half-wave rectified power includes a diode connected in parallel across said doorbell switch.

17. The detector circuit as recited in claim 12, wherein said power supply includes a power supply capacitor.

18. A detector circuit for a doorbell adapted to be connected to a source of electrical power and a plurality of doorbell switches, each of said doorbell switches adapted to be connected to a doorbell transformer, a diode connected in parallel across one of said plurality of doorbell switches to supply a source of half-wave rectified electrical power to said circuit when said doorbell switch is not depressed and an unrectified signal when said doorbell switch is depressed, the detector circuit comprising:

a power supply electrically coupled to said source of half-wave electrical power, said power supply configured to provide a positive output voltage in response to a half-wave rectified power signal, irrespective of the polarity of said half-wave rectified power signal; and a circuit electrically coupled to said power supply configured to detect when a doorbell switch has been depressed.

19. The detector circuit as recited in claim 18, wherein said circuit includes a comparator having a threshold, wherein the threshold is set such that the logic states of said comparator change when any of said doorbell switches is depressed.

20. The detector circuit as recited in claim 18, further including a plurality of amplifiers, electrically coupled to said doorbell switches for amplifying said half-wave and unrectified signals, the output of amplifiers being electrically coupled to said comparators.

21. The detector circuit as recited in claim 18, wherein detector circuit is formed with a plurality of channels adapted to being electrically coupled to a plurality of doorbell switches, each channel including an amplifier and a comparator, each of said sound generator having a plurality of channels for providing a plurality of different audible indications, wherein the output of each of said comparators is connected to a different channel of said sound generator to provide an audible indication of the doorbell switch depressed.

22. The detector circuit as recited in claim 18, wherein said power supply includes at least one full-wave rectifier.

* * * * *